(12) United States Patent
Gresens (10) Patent No.: US 7,954,312 B2
(45) Date of Patent: Jun. 7, 2011

(54) APPROACH FOR DETECTING REDUCTANT AVAILABILITY AND MAKE-UP

(75) Inventor: Bradley Dane Gresens, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 903 days.

(21) Appl. No.: 11/746,351

(22) Filed: May 9, 2007

(65) Prior Publication Data

US 2008/0276598 A1    Nov. 13, 2008

(51) Int. Cl.
*F01N 3/00* (2006.01)
(52) U.S. Cl. ............... 60/286; 60/274; 60/276; 60/301; 60/303
(58) Field of Classification Search .............. 60/274, 60/276, 286, 295, 301, 303
See application file for complete search history.

(56) References Cited

U.S. PATENT DOCUMENTS

| 5,628,186 | A | | 5/1997 | Schmelz | |
|---|---|---|---|---|---|
| 6,063,350 | A | * | 5/2000 | Tarabulski et al. | 423/239.1 |
| 6,192,677 | B1 | * | 2/2001 | Tost | 60/286 |
| 6,209,315 | B1 | | 4/2001 | Weigl | |
| 6,293,097 | B1 | * | 9/2001 | Wu et al. | 60/286 |
| 6,363,771 | B1 | * | 4/2002 | Liang et al. | 73/23.31 |
| 6,408,619 | B1 | | 6/2002 | Wissler | |
| 6,637,196 | B1 | | 10/2003 | Tost | |
| 6,711,893 | B2 | * | 3/2004 | Ueda et al. | 60/285 |
| 6,912,846 | B2 | * | 7/2005 | Huber et al. | 60/286 |
| 6,941,746 | B2 | * | 9/2005 | Tarabulski et al. | 60/286 |
| 7,775,036 | B2 | * | 8/2010 | Barcin | 60/286 |
| 7,836,684 | B2 | * | 11/2010 | Starck et al. | 60/286 |
| 2003/0033799 | A1 | * | 2/2003 | Scheying | 60/286 |
| 2005/0011183 | A1 | | 1/2005 | Ripper et al. | |
| 2006/0086084 | A1 | | 4/2006 | Gerlach | |

FOREIGN PATENT DOCUMENTS

EP    1669742    6/2006
EP    1681444    7/2006

OTHER PUBLICATIONS

EPO, International Search Report of GB0807873.5, Jul. 16, 2008, EPO, 1 page.

* cited by examiner

*Primary Examiner* — Binh Q Tran
(74) *Attorney, Agent, or Firm* — Julia Voutyras; Alleman Hall McCoy Russell & Tuttle LLP (57) ABSTRACT

A engine system having a reductant delivery and storage system is described. In one example, a physical condition associated with a reductant storage device is correlated with a characteristic of a fluid stored in the reductant storage device to determine the availability and make-up of the stored fluid. In response, engine operation may be adjusted.

15 Claims, 5 Drawing Sheets

APPROACH FOR DETECTING REDUCTANT AVAILABILITY AND MAKE-UP

TECHNICAL FIELD

The present application relates to the field of automotive emission control systems and methods.

BACKGROUND AND SUMMARY

Selective catalytic reduction (SCR) systems have been used to reduce automotive emissions. However, SCR systems may rely on the availability and make-up of a reductant, such as urea, stored in an on-board storage device. For example, the on-board storage device may become substantially empty. Alternately or in addition, a vehicle operator may introduce an ineffective fluid to a reductant storage device.

One way to detect the availability of a reductant attaches various sensors to the on-board storage device to independently detect the availability of reductant. For example, a sensor, such as a level sensor, can be used to detect a physical condition of the on-board storage device. However, the sensor may detect a false empty condition when the vehicle is traveling on an incline, and the stored fluid accumulates at the downhill region of the on-board storage device. Further, the sensor may detect that fluid may be available in the on-board storage device although the fluid may not be a reductant. In yet another example, a sensor, such as a thermal conductivity sensor, can detect a property of the stored fluid to verify that an appropriate reductant may be stored in the on-board storage device. However, erroneous detection of a reductant may occur when a non-urea solution (or reduced-urea solution) with the same or similar property may be introduced to the on-board storage device.

The inventors herein have realized that a logic driven method may be implemented by coordinating a physical condition associated with a reductant storage device, wherein the physical condition may correspond to a measure of liquid stored in the reductant storage device, with a characteristic of a fluid stored in the reductant storage device to determine the availability and make-up of the stored fluid, wherein at least one of the physical condition and the property of the stored fluid is determined by a plurality of sensors, and adjusting engine operation based on said coordinating the condition associated with the reductant storage device with the property of the stored fluid. Such methods of coordinating pluralities of conditions and properties associated with the emission control system may facilitate delivery of a reductant to the emission control device.

DETAILED DESCRIPTION OF THE DEPICTED EMBODIMENTS

Figure 1:
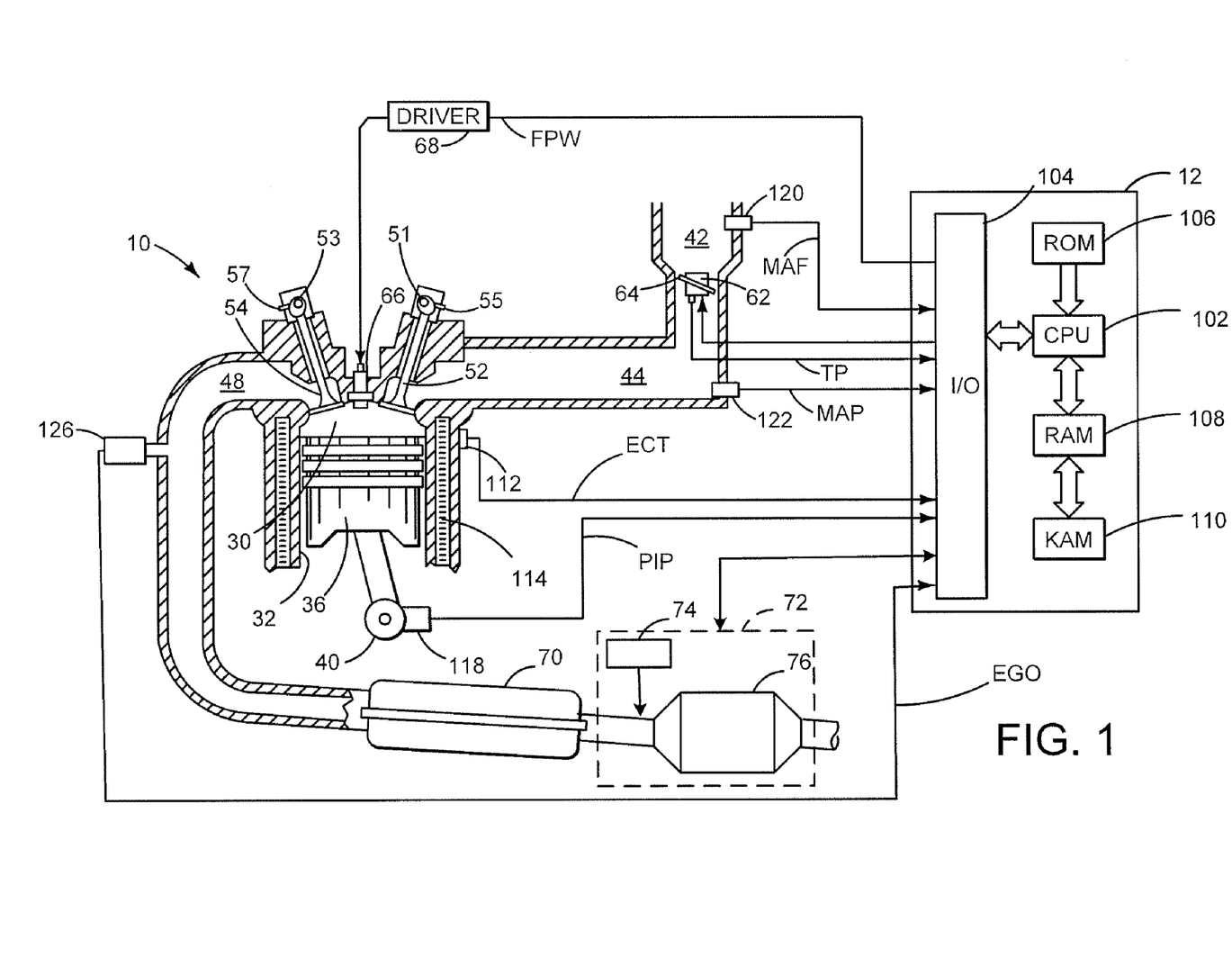
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage device 74 and emission control device 76. Emission control device 76 is shown in communication with catalytic converter 70. Reductant storage device 74 may supply a reductant to an exhaust stream entering emission control device 76. Emission control system 72 is described in more detail in FIG. 2.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load. Controller 12 is configured to control emission control system 72. Further, emission control system 72 may send feedback to controller 12. This feature is described in more detail below.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

Figure 2:
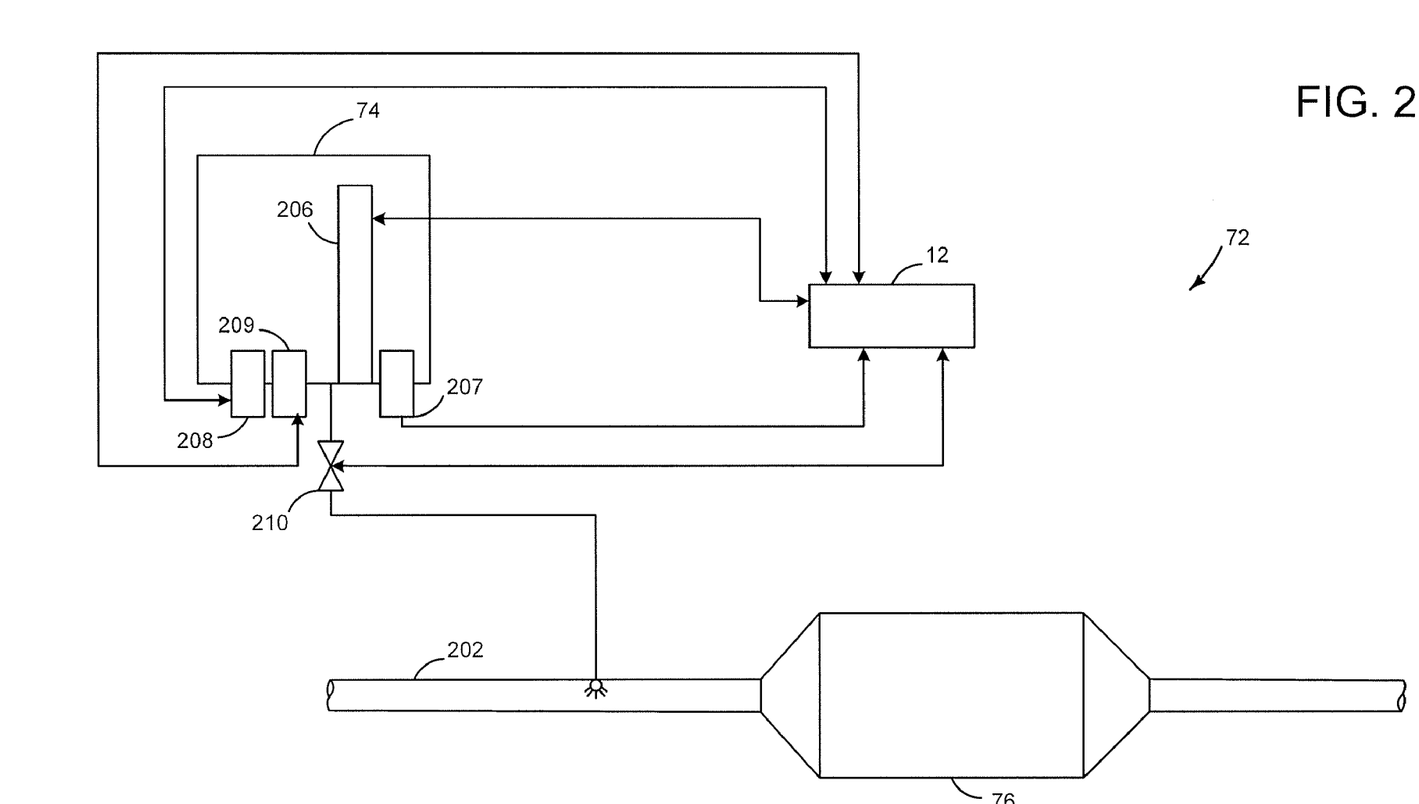
FIG. 2 shows an exemplary embodiment of an emission control system.

FIG. 2 shows an example of emissions control system 72 of engine 10 in more detail. Generally, the components described herein may operate to determine the availability and make-up of a fluid stored in reductant storage device 74. In particular, the emission control system may be monitored by various components to determine a physical condition associated with a measure of fluid stored in the reductant storage device to determine the availability of a fluid and a property of the stored fluid to determine the make-up of the fluid. As described in FIG. 1, emission control system 72 may include emission control device 74 configured to selectively supply a reductant to emission control device 76. Further, emission control system 72 may include controller 12 configured to process information within the emission control system from various components.

Reductant storage device 74 may be an on-board storage device for storing a reductant used in emission control device 76. The reductant storage device may include a plurality of sensors. In particular, the emission control system may include a first sensor for determining a physical condition associated with a measure of fluid stored in the reductant storage device, and a second sensor for determining a property of a fluid stored in the reductant storage device. Further, a physical condition associated with a measure of stored fluid may be coordinated with a property of the stored fluid to determine the availability and make-up of reductant for reducing NOx in the emission control system. This feature may be described in detail below.

In some embodiments, the first sensor may detect one or more conditions of the reductant storage device that may be coordinated to determine a physical condition of the reductant storage device. For example, the first sensor may detect a level and a pressure in the reductant storage device. Specifically, the level and pressure may be coordinated to determine a physical condition, such as a measure of fluid in the reductant storage device. More specifically, the first sensor may coordinate a detected level with a detected pressure to determine whether or not the reductant storage device may be empty. In another embodiment, the first sensor may be a first sensor group including a plurality of sensors. For example, the first sensor group may include a level sensor 206 and a pressure sensor 207 that may be separate from the level sensor. As such, feedback from the sensors may be correlated to determine a physical condition of the reductant storage device.

Similarly, the second sensor may detect one or more properties of the reductant storage device that may be coordinated to determine a characteristic of a fluid stored in the reductant storage device. For example, the second sensor may detect a thermal conductivity and a permittivity of the stored fluid, where the thermal conductivity and permittivity may be coordinated to determine a characteristic of the fluid, such as a concentration. More specifically, the second sensor may coordinate a detected thermal conductivity (i.e. by measuring temperature, resistance, etc.) with a detected permittivity (i.e. by measuring dielectric constant, capacitance, etc.) to determine whether or not the concentration of reductant in a stored fluid may be associated with a suitable reductant. It may be understood that various other properties associated with the fluid may be detected to determine a characteristic of the stored fluid, including but not limited to electrical conductivity, viscosity, opacity, and acidity. In another embodiment, the second sensor may be a second sensor group including a plurality of sensors. For example, the first sensor group may include a thermal conductivity sensor 208 and a permittivity sensor 209 that may be separate from the conductivity sensor sensor. As such, feedback from the sensors may be correlated to determine a characteristic of the fluid stored in the reductant storage device.

It may be understood that the sensors may detect conditions and properties associated with a stored fluid where the fluid may be a liquid and/or a vapor. In one example, a sensor may detect a hydrostatic pressure of a fluid and/or a vapor pressure in the reductant storage device.

Controller 12 may receive feedback from the sensors to determine the availability and make-up of the stored fluid. In particular, controller 12 may determine whether or not a measure of fluid may be stored in the reductant storage device and whether or not the properties of the fluid correspond to a suitable reductant. This feature may be described in detail below.

It may be appreciated that feedback including information on a physical condition of the reductant storage device based on multiple conditions sensors and a characteristic of the stored fluid based on multiple detected properties from the sensors described above may verify the availability and make-up of a reductant to reduce NOx in the exhaust. In this way, the emission control system may monitor the reductant storage device so as to facilitate reduction of NOx. verify that the fluid may be a reductant available in a sufficient amount.

Under some conditions, the reductant storage device may supply the stored fluid to the exhaust system upstream the emission control device. In particular, it may be determined to supply an amount of reductant to emission control device 76 based on the availability and make-up of the stored fluid, as determined by the sensors. Accordingly, the controller may prompt a reductant valve 210 fluidically disposed along a conduit coupling the reductant storage device to the exhaust system to release an amount of reductant from the reductant storage device so as to substantially reduce NOx entering emission control device 76. As such, a reductant from the reductant storage device may be absorbed in emission control device 76 to reduce NOx in the exhaust stream.

In the embodiment described herein, the reductant may be urea, although various other reductants may also be used. First, urea added to the exhaust system may decompose into ammonia as follows:

$$CO(NH_2)_2 \rightarrow NH_3 + HNCO$$

$$HNCO + H_2O \rightarrow NH_3 + CO_2$$

Ammonia may, in turn, react with NOx in the SCR catalyst according to various different reaction pathways, including but not limited to one or more of the following:

$$4NO + 4NH_3 + O_2 \rightarrow 4N_2 + 6H_2O$$

$$2NO_2 + 4NH_3 + O_2 \rightarrow 3N_2 + 6H_2O$$

$$6NO_2 + 8NH_3 + \rightarrow 7N_2 + 12H_2O$$

$$NO + NO_2 + 2NH_3 \rightarrow 2N_2 + 3H_2O$$

It may be desirable to introduce an amount of urea to the exhaust system generally derived from the above NOx reduction reaction stoichiometries or a look-up table stored in the controller. In particular, the amount of urea introduced to the exhaust system may be based on information from a sensor. For example, the output signal from a sensor, such as exhaust gas manifold sensor 126 shown in FIG. 1, may indicate an amount of NOx in the exhaust. As such, the controller may prompt the reductant valve to introduce an amount of urea to the exhaust system accordingly where the amount of urea injected may be expected to substantially consume the urea and convert a substantial portion of the NOx. Further, the controller may monitor various species (i.e. urea, ammonia, NOx, etc) entering and/or leaving the SCR catalyst to determine a conversion efficiency of the emission control system.

Emission control system 72 may operate to verify the availability and make-up of the stored fluid supplied to the emission control device. In particular, controller 12 may receive feedback from various other sensors (e.g. an ammonia sensor, a NOx sensor, etc.) in the emission control system to determine whether an amount of urea to be introduced to the exhaust system, as determined from the above NOx reduction reaction stoichiometries or a look-up table stored in the controller, may be present in reductant storage device 74. Further, an amount of reductant determined to substantially consume NOx in the exhaust may vary with load, engine RPM, engine speed, exhaust gas temperature, exhaust gas flow, engine fuel injection time, and desired NOx reduction.

Figure 3:
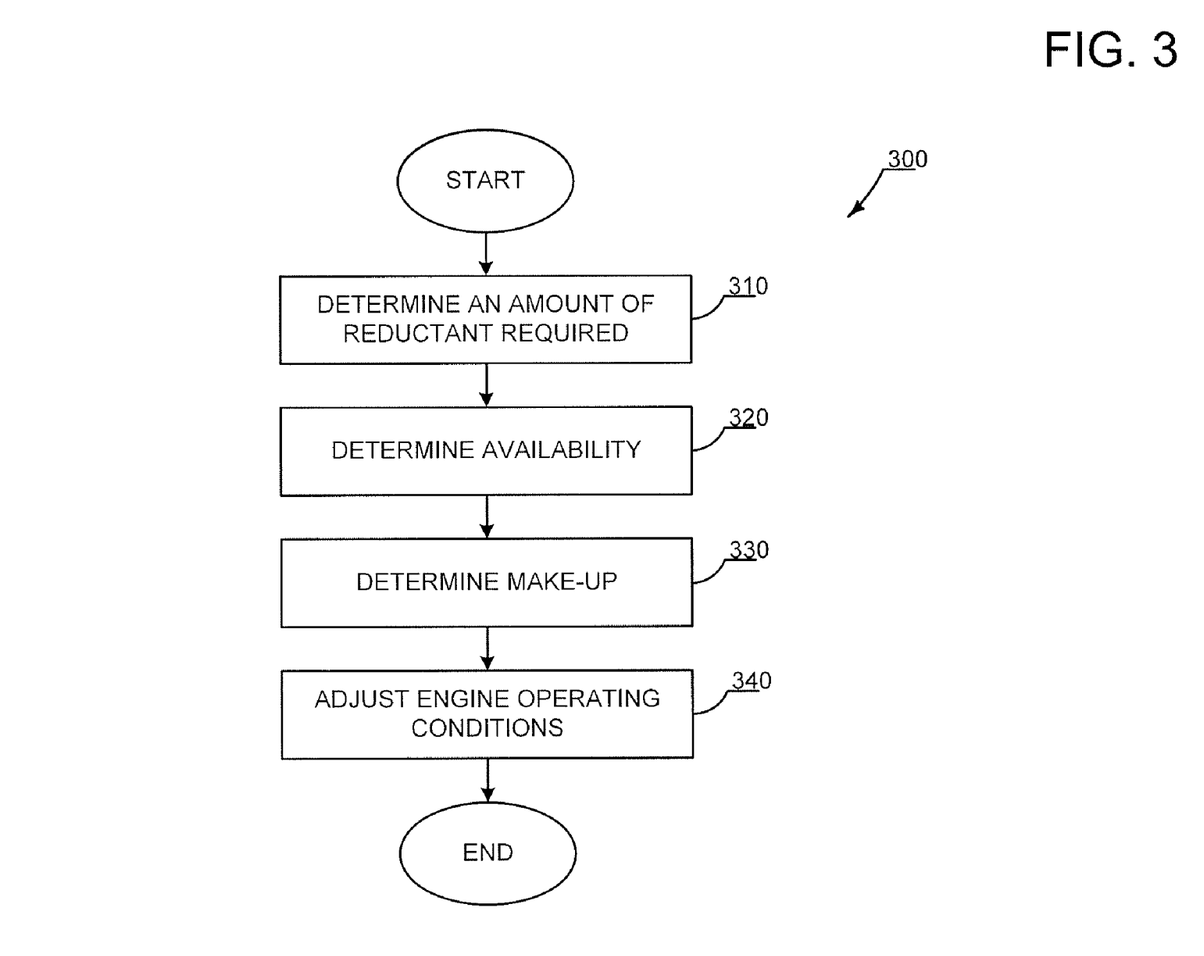
FIG. 3 is a flowchart of an exemplary method for monitoring an amount of reductant available in an emission control system.

FIG. 3 illustrates a flow chart of an exemplary method for operating emission control system 72. Generally, method 300 may adjust engine operation based on an amount of reductant required and the availability and make-up of a fluid stored in the reductant storage device. In particular, method 300 includes determining a physical condition (e.g., an empty tank, etc) corresponding to a measure of fluid stored in the reductant storage device and determining a characteristic of a fluid stored in the reductant storage device to determine the availability and make-up of the stored fluid and adjusting engine operating conditions based on a correlation between the measure of fluid and the characteristic of the stored fluid and an amount of reductant determined to substantially reduce NOx in the exhaust. In this way, method 300 may determine the availability and make-up of the stored fluid so as to facilitate NOx abatement.

At 310, method 300 may determine an amount of reductant required to substantially reduce NOx in exhaust system 202. As described above, an amount of reductant, such as urea, may be derived from NOx reduction reaction stoichiometries or a look-up table stored in the controller based on an output signal from a sensor, such as exhaust gas manifold sensor 126 shown in FIG. 1.

Next, at 320, method 300 may determine an availability of fluid stored in the reductant storage device. In particular, a sensor may send feedback to the controller including a condition, such as a level of fluid stored in the reductant storage device, a hydrostatic pressure of the stored fluid, a vapor pressure in the reductant storage device, etc. Each condition may be associated with a physical condition of the reductant storage device.

In one embodiment, a physical condition may be correlated to a measure of fluid in the reductant storage device. For example, a level of fluid detected may be correlated to a measure of fluid in the reductant storage device. In another example, a hydrostatic pressure may be correlated to a measure of fluid in the reductant storage device. The controller may coordinate a measure of fluid based on the level with a measure of fluid based on the hydrostatic pressure to determine a measure of fluid of the reductant storage device. Under some conditions, a measure of fluid determined based on feedback from level sensor 206 and a measure of fluid determined based on feedback from pressure sensor 207 may be substantially equivalent. However, under other conditions, a measure of fluid determined based on feedback from level sensor 206 and a measure of fluid determined based on feedback from pressure sensor 207 may not be substantially equivalent. For example, measures of fluid determined based on feedback from level sensor 206 and pressure sensor 207 may not be substantially equivalent when, during vehicle operation on unsmooth surfaces, fluid stored in the reductant storage device may splash on level sensor 206 such that a measure of fluid determined based on the level may be false. As such, a measure of fluid determined based on the level sensor may not be substantially equivalent to a measure of fluid determined based on the hydrostatic pressure. Accordingly, when a measure of fluid based on a level of fluid may not be substantially equivalent to a measure of fluid based on a hydrostatic pressure, feedback from the sensors may be sent to the controller to be diagnosed.

In another embodiment, a physical condition may indicate whether or not the reductant storage device may be substantially empty. For example, it may be determined that the reductant storage device may be substantially empty when a level of fluid may be less than a threshold fluid level associated with a substantially empty tank. In another example, it may be determined that the reductant storage device may be substantially empty when a hydrostatic pressure may be less than a threshold pressure associated with a substantially empty tank. Under some conditions, feedback from both sensor may determine that the reductant storage device may be substantially empty. However, under other conditions, it may be determined that the reductant storage device may be substantially empty based on feedback from level sensor 206 while it may be determined that the reductant storage device may not be substantially empty based on feedback from pressure sensor 207. For example, a false empty reductant storage device may be determined based on the hydrostatic pressure in the reductant storage device when the vehicle operates on an incline such that a reduced measure of fluid may be detected by pressure sensor 207. As such, it may be desirable to determine that the reductant storage tank may be substantially empty when both the level of fluid may be less than a threshold fluid level and the hydrostatic pressure may be less than a threshold pressure. In this way, information from a plurality of sensors may be used to verify a physical condition of an empty reductant storage device.

At 330, method 300 may determine a make-up of the stored fluid. In some embodiments, a characteristic, such as a concentration of reductant in the fluid, may be determined based on detected properties of the fluid. In particular, a sensor may send feedback to the controller including a property of the fluid, such as thermal conductivity, permittivity, etc. Each condition may be associated with a concentration of reductant in the liquid, as defined by a look-up table, for example. Under some conditions, a concentration of a fluid based on a thermal conductivity, for example, may be substantially equivalent to a concentration of a fluid based on a permittivity. As such, the controller may use the determined concentration to adjust reductant injection, for example. Under other conditions, concentrations based on thermal conductivity and permittivity may not be substantially equivalent. In particular, a fluid may have some properties corresponding to a concentration of reductant, while other properties may not correspond to the same concentration of reductant. As such, it may be desirable to diagnose the system when various properties of the stored fluid may not correspond to a substantially equivalent concentration of reductant.

It may be appreciated that a system component monitor (not shown) may analyze output signals from the sensors described herein. In particular, the system component monitor may determine that input values may be valid. Specifically, degradation of a sensor may result in inaccurate readings such that the system component monitor may be able to detect degradation of one or more sensors whereby the degradation may be communicated to controller 12 to perform default mode management. For example, if a sensor may measure a deviant property and/or condition, the sensor output may be at least temporarily disregarded until the degradation may be resolved. Further, a microcontroller may analyze valid sensor inputs to derive comparable measurements within the system. For example, valid inputs of dielectric constant, capacitance, temperature, and conductivity may be analyzed by the microcontroller to derive one or more concentrations of the stored fluid.

At 340, method 300 may adjust engine operating conditions based on the determined measure of fluid stored in the reductant storage device and characteristic of the stored fluid. Under some conditions, controller 12 may adjust an injection amount to introduce an amount of reductant stored in the reductant storage device to the exhaust. In particular, if it may be determined that a measure of fluid may be greater than an amount of reductant determined at step 310, the controller may determine whether a characteristic of the stored fluid may be associated to a suitable reductant. Further, an amount of reductant may be adjusted based on a concentration of reductant in the liquid determined at step 330. As such, the controller may prompt an injection amount based on the availability and make-up of the stored fluid. Under other conditions, a measure of stored fluid and/or a characteristic of the stored fluid may not facilitate NOx reduction. For example, a physical condition of the reductant storage device associated with a substantially empty reductant storage tank may be determined at step 320. In another example, it may be determined that the stored fluid may not be a suitable reductant (e.g., the concentration of reductant may be less than a concentration required to reduce NOx, etc.). As such, the controller may adjust engine operating conditions. In one embodiment, the controller may send a signal so as to indicate a degraded reductant and/or an empty reductant storage tank. Alternately or in addition, the controller may at least temporarily enable various other emission control strategies using a reduced amount of reductant. For example, the controller may control engine operation so as to abate NOx via various other mechanisms, such as exhaust gas recirculation, engine timing, derating, etc.

Figure 4:
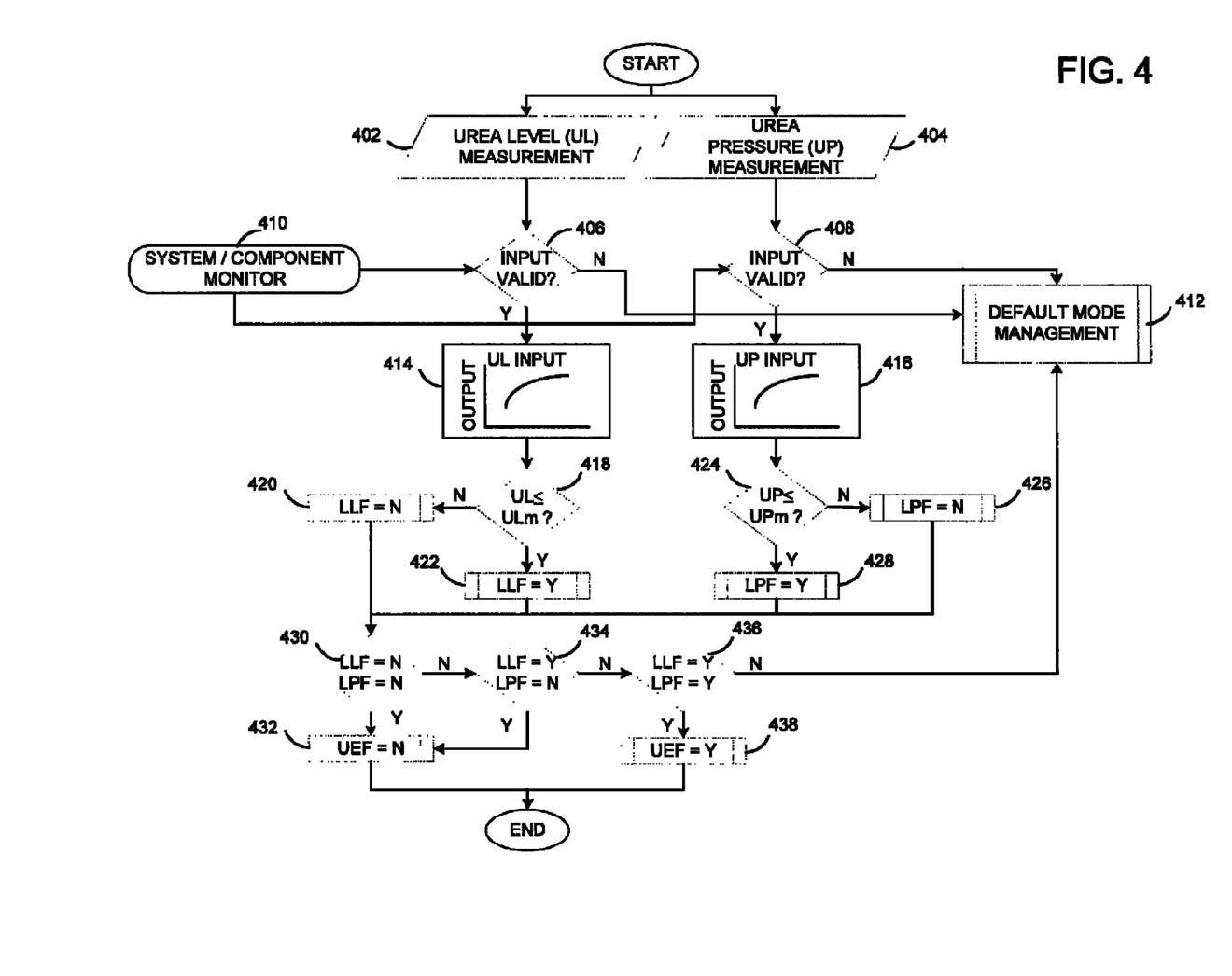
FIG. 4 is a flowchart of an exemplary method for detecting low levels of reductant in a reductant storage device.

FIG. 4 illustrates a flowchart of an embodiment of a method for determining whether or not a measure of liquid in the reductant storage device corresponds to a substantially empty reductant storage device. In particular, method 400 may set a urea empty flag (UEF) based on a urea level (UL) measurement and a urea pressure (UP) measurement whereby controller 12 may adjust engine operation to abate NOx via various other mechanisms. In the embodiment described herein, controller 12 may set an empty flag when a level may be less than a predetermined level and when a hydrostatic pressure in the reductant storage tank may be less than a predetermined hydrostatic pressure, as described herein.

First, at steps 402 and 404, method 400 may measure various conditions of the reductant storage device. While method 400 includes measuring a urea level (UL) in the storage tank and a urea pressure (UP) of in the storage tank, it may be appreciated that various other conditions relating to the reductant storage device may be measured to determine the availability of a stored fluid. Further, method 400 may measure a measure of any fluid stored in the reductant storage device, although urea may be used as an exemplary fluid as discussed in method 400. At step 402, a urea level (UL) measurement may be determined. In some embodiments, level sensor 206 may detect a level of urea in the reductant storage device. Similarly, at 404, a urea pressure measurement may be determined. Specifically, pressure sensor 207 may determine a hydrostatic pressure of urea in the reductant storage device.

Next, at steps 406 and 408, method 400 may determine whether input values to level sensor 206 and pressure sensor 207, respectively, may be valid. In particular, method 400 may not use invalid input measurements to determine whether the reductant storage device may be empty or may not contain sufficient amounts of urea. System component monitor, as shown at 410, may analyze sensor inputs to detect whether sensor inputs may be valid. Accordingly, invalid sensor inputs may be sent to default mode management, as shown at 412. Specifically, if at 406, input to level sensor 206 may not be valid and the answer may be no, default mode management may be prompted to diagnose invalid inputs from the level sensor. Similarly, if at 408, input to pressure sensor 408 may not be valid and the answer may be no, default mode management may be prompted to diagnose invalid inputs from the pressure sensor. However, if the answer to 406 and 408 may be yes, the valid inputs from each sensor may be sent to a microcontroller to generate sensor outputs.

Referring first to level sensor 408, valid urea level (UL) inputs may be converted at the level sensor microcontroller, as shown at 414. For example, a portion of level sensor 408 may change phase corresponding to the portion of the level sensor immersed by urea. Input to the level sensor may be converted to an output signal indicating a level of urea detected in the reductant storage device. Similarly, valid urea pressure (UP) inputs from pressure sensor 207 may be converted at the pressure sensor microcontroller, as shown at 416. In particular, the hydrostatic pressure of the urea may be converted to an output signal indicating a urea system pressure.

Next, referring first to level sensor 206 at step 418, method 400 determines whether a detected urea level (UL) may be below a predetermined level, such as a minimum urea level threshold (ULm). In some embodiments, a minimum urea level threshold (ULm) may correspond to a level in the reductant storage device associated with a condition of a substantially empty reductant storage device. However, in other embodiments, a minimum urea level threshold (ULm) may vary based on an amount of NOx in the exhaust. If it may be determined at 418 that the detected urea level (UL) may be equal to or greater than the minimum urea level threshold (ULm), then a low level flag (LLF) may not be set, as indicated at 420. If it may be determined at 418 that the detected urea level (UL) may be below the minimum urea level threshold (ULm), then the low level flag (LLF) may be set, as indicated at 422.

Referring now to pressure sensor 207 at step 424, method 400 determines whether a urea pressure (UP) may be below a predetermined level, such as a minimum urea pressure threshold (UPm). In some embodiments, a minimum urea pressure threshold (UPm) may correspond to a hydrostatic pressure of the urea in the reductant storage device associated with a condition of a substantially empty reductant storage device. However, in other embodiments, a minimum urea pressure threshold (UPm) may vary based on an amount of NOx in the exhaust. If it may be determined at 424 that the detected urea pressure (UP) may be equal to or greater than the minimum urea pressure threshold (UPm), then a low pressure flag (LPF) may not be set, as indicated at 426. If it may be determined at 424 that the detected urea level (UP) may be below the minimum urea pressure threshold (UPm), then the low pressure flag (LPF) may be set, as indicated at 428.

Next, at step 430, it may be determined whether both the low level flag (LLF) and the low pressure flag (LPF) may not be set. If yes, then a urea empty flag (UEF) may not be set, as indicated at 432. For example, the reductant storage device may include a sufficient amount of urea such that the urea level and pressure exceed predetermined values derived to substantially reduce NOx in the exhaust. If no, then method 400 continues to step 434.

At 434, it may be determined whether the low level flag (LLF) may be set and the low pressure flag (LPF) may not be set. For example, during vehicle operation on a steep gradient, urea may at least temporarily collect over pressure sensor 207 (e.g. when the pressure sensor may be disposed at a lower region of the reductant storage device) while level sensor 206 may not be exposed to a substantial amount of urea. If yes, then the urea empty flag (UEF) may not be set, as indicated at 432.

If no, then method 400 continues to step 436. At 436, it may be determined whether the low level flag (LLF) may be set and the low pressure flag (LPF) may be set. If yes, then the urea empty flag (UEF) may be set, as indicated at 438. For example, the reductant storage device may be substantially empty. If no, then method 400 returns to 412 whereat default mode management may be prompted to diagnose the problem. For example, controller 12 may not receive information associated with the low level flag (LLF) and/or the low pressure flag (LPF).

It may be appreciated that, in the embodiment described by FIG. 4, both a urea level (UL) and a urea pressure (UP) of the reductant storage device may be below the predetermined values associated with each measurement so as to prompt an empty flag. By doing this, the urea empty flag (UEF) may not be erroneously set based on an inaccurate reading from a single sensor.

Further, controller 12 may operate to initiate desired operating conditions in response to the urea empty flag (UEF). For example, the controller may send a signal so as to indicate an empty reductant storage tank so as to prompt a refill event. Alternately or in addition, the controller may enable various other emission control strategies until the urea empty flag (UEF) may be deactivated. For example, the controller may control engine operation so as to abate NOx via various other mechanisms, such as exhaust gas recirculation, engine timing, derating, etc.

Figure 5:
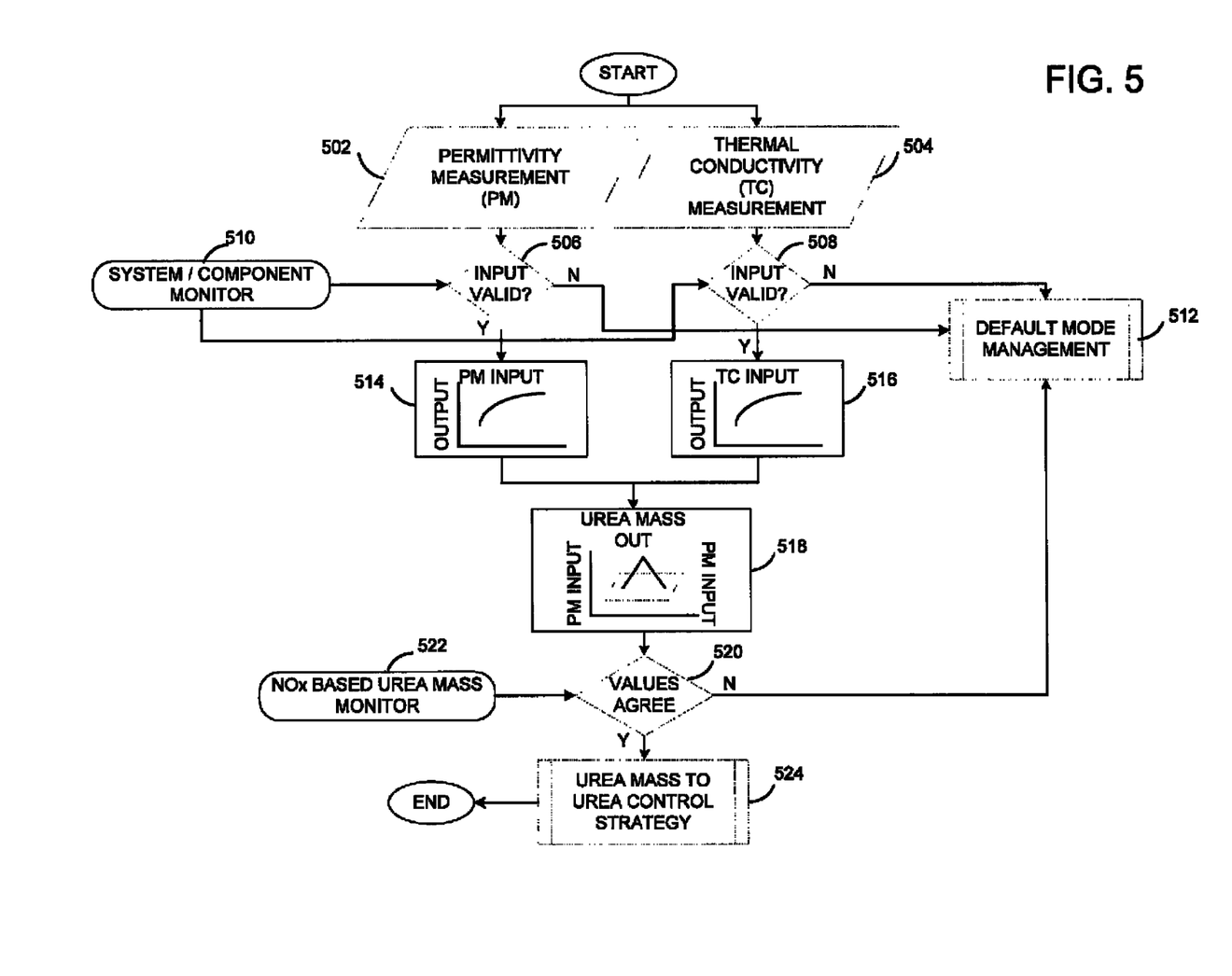
FIG. 5 is a flowchart of an exemplary method for detecting a characteristic of a fluid in a reductant storage device.

FIG. 5 illustrates a flowchart of an embodiment of a method for operating the emission control system based on a determined concentration of reductant in the reductant storage device. In particular, method 500 may adjust engine operation based on feedback from thermal conductivity sensor 208 and permittivity sensor 209. In the embodiment described herein, controller 12 may determine a concentration of reductant in the reductant storage device when a concentration based on a permittivity measurement may be substantially equivalent to a concentration based on a thermal conductivity measurement, as described herein.

First, at steps 502 and 504, method 500 may measure various properties of the fluid stored in the reductant storage device. While method 500 includes taking a permittivity measurement (PM) and a thermal conductivity (TC) measurement, it may be appreciated that various other properties relating to the fluid stored in the reductant storage device may be measured to determine the concentration of the reductant. Further, the embodiment described in method 500 may adjust engine operation based on the concentration of any reductant, although urea may be used as an exemplary fluid as discussed in method 500. At step 502, a permittivity measurement (PM) may be determined. In some embodiments, permittivity sensor 209 may detect a permittivity of the fluid stored in the reductant storage device. Similarly, at 504, a thermal conductivity (TC) measurement may be determined. Specifically, thermal conductivity sensor 208 may determine a thermal conductivity of urea in the reductant storage device.

Next, at steps 506 and 508, method 500 may determine whether input values to permittivity sensor 209 and thermal conductivity sensor 208, respectively, may be valid. In particular, method 500 may not use aberrant input measurements to determine whether the reductant storage device may be empty or may not contain sufficient amounts of urea. System component monitor, as shown at 510, may analyze sensor inputs to detect whether sensor inputs may be valid. Accordingly, invalid sensor inputs may be sent to default mode management, as shown at 512. Specifically, if at 506, input to permittivity sensor 209 may not be valid and the answer may be no, default mode management may be prompted to diagnose invalid inputs from the level sensor. Similarly, if at 508, input to thermal conductivity sensor 208 may not be valid and the answer may be no, default mode management may be prompted to diagnose invalid inputs from the pressure sensor. However, if the answer to 506 and 508 may be yes, the valid inputs from each sensor may be sent to a microcontroller to generate sensor outputs.

Referring first to permittivity sensor 209, valid permittivity measurement (PM) inputs may be converted at the permittivity sensor microcontroller, as shown at 514. For example, an analog electronic circuit in the permittivity sensor may detect various measurements associated with the permittivity of the liquid, such as dielectric constant and/or capacitance. Input to the level sensor may be converted to an output signal indicating permittivity of the fluid stored in the reductant storage device. Similarly, valid thermal conductivity (TC) inputs from thermal conductivity sensor 208 may be converted at the thermal conductivity sensor microcontroller, as shown at 516. For example, an analog electronic circuit in the thermal conductivity sensor may detect various properties associated with the thermal conductivity of the fluid, such as conductivity and/or temperature. Input to the thermal conductivity sensor may be converted to an output signal indicating the thermal conductivity of the fluid stored in the reductant storage device.

Next, at 518, input to permittivity the sensors may be compared in a table. In particular, input from permittivity sensor 209 and thermal conductivity sensor 208 may be compared. In one embodiment, information associated with the dielectric constant, capacitance, temperature, and conductivity of the fluid stored in the reductant storage device may be compared in a table to determine a concentration of the fluid.

Continuing to step 520, it may be determined whether the inputs from the sensors may agree. In particular, a NOx based urea mass monitor, as shown at 522, may determine that a mass and/or concentration of reductant in the reductant storage device corresponding to the properties of the fluid measured by permittivity sensor 209 and thermal conductivity sensor 208. However, under some conditions, the inputs from the sensors may not agree. Specifically, properties of the fluid detected by the sensors may not correspond to a concentration of reductant. As such, at 520, if no, method 500 may return to step 512 where default mode management may diagnose the system. If yes, then method 500 continues to 524.

At 524, the urea mass and/or concentration may be sent to a urea control strategy. In particular, the urea control strategy may adjust injection of the stored reductant based on information including a mass and/or concentration of reductant matching feedback from permittivity sensor 209 and thermal conductivity sensor 208. For example, an amount of reductant may be introduced to the exhaust based on the urea mass and/or concentration.

It may be appreciated that the order of processing to be detailed is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium for the sensor, for example, in the engine control system.

The invention claimed is:

1. An apparatus, comprising:
an internal combustion engine;
an emission control device comprising a catalyst;
a reductant storage device configured to store a reductant that is provided to the emission control device;
a level sensor configured to detect a level of a fluid stored in the reductant storage device;
a pressure sensor configured to detect a hydrostatic pressure of the stored fluid in the reductant storage device, the pressure sensor coupled to a lower region of the reductant storage device; and
a controller comprising memory and a processor, the memory comprising instructions executable by the processor to determine whether the reductant storage device is substantially empty based on each of the detected level and pressure of the stored fluid.

2. The apparatus of claim 1, wherein the reductant storage device is determined to be substantially empty if the level of the stored fluid is below a predetermined level and the hydrostatic pressure of the stored fluid is below a predetermined level.

3. The apparatus of claim 1, wherein the memory further comprises instructions to determine whether the reductant storage device is substantially empty in response to a factor including at least one of an angle of inclination of the reductant storage device and a surface condition of a road.

4. The apparatus of claim 1, wherein the memory further comprises instructions to at least temporarily enable an emission control strategy using less or no reductant if the reductant storage device is determined to be substantially empty.

5. The apparatus of claim 2, wherein a concentration of the stored fluid is determined when the level of the fluid is above or equal to the predetermined level and the pressure is above or equal to the predetermined pressure.

6. A method for operating an engine having a reductant system, comprising:
identifying a reductant amount from reductant storage level and hydrostatic pressure of stored reductant;
identifying a reductant make-up from reductant permittivity and reductant thermal conductivity; and
adjusting operation based on the identified reductant amount and make-up.

7. The method of claim 6, wherein said adjusting operation includes sending a signal prompting a reductant fill event based on the identified reductant amount and make-up.

8. The method of claim 6, wherein said adjusting operation includes using less or no reductant during engine operation based on the identified reductant amount and make-up.

9. The method of claim 6, wherein the make-up is a reductant concentration.

10. A method for operating an engine having a reductant system, comprising:
identifying a reductant storage amount from first and second sensors coupled to a reductant storage tank at different locations and each indicating different properties of stored reductant;
identifying a reductant make-up from third and fourth sensors each indicating different properties of stored reductant; and
adjusting operation based on the identified reductant amount and make-up.

11. The method of claim 9, wherein the third sensor is a permittivity sensor, and the fourth sensor is a thermal conductivity sensor.

12. The method of claim 9, wherein the properties include one or more of an electrical conductivity, a viscosity, an opacity, and an acidity of the stored fluid.

13. The method of claim 9, wherein the adjusting operation includes degradation management, including temporarily stopping reductant usage.

14. The method of claim 9, wherein the adjusting operation includes adjusting reductant injection into an exhaust of the engine based on the identified make-up and the amount.

15. The method of claim 9, wherein the first sensor is a level sensor and the second sensor is a hydrostatic pressure sensor coupled to a lower region of a reductant storage tank.

* * * * *